(12) United States Patent
Varghese et al.

(10) Patent No.: US 10,508,624 B2
(45) Date of Patent: Dec. 17, 2019

(54) AIR FILTER WITH CANTILEVER TAB AND ENGINE AIR FILTER ASSEMBLY INCORPORATING SAME

(71) Applicants: Benny Mathew Varghese, Kearney, NE (US); Timothy L. Krull, Kearney, NE (US); Steven J. Merritt, Kearney, NE (US); Jeffrey E. D. Rogers, Kearney, NE (US)

(72) Inventors: Benny Mathew Varghese, Kearney, NE (US); Timothy L. Krull, Kearney, NE (US); Steven J. Merritt, Kearney, NE (US); Jeffrey E. D. Rogers, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 190 days.

(21) Appl. No.: 15/443,910

(22) Filed: Feb. 27, 2017

(65) Prior Publication Data

US 2018/0245548 A1 Aug. 30, 2018

(51) Int. Cl.
*F02M 35/024* (2006.01)
*B01D 46/00* (2006.01)
*B01D 46/24* (2006.01)
*F02M 35/02* (2006.01)

(52) U.S. Cl.
CPC ... *F02M 35/02416* (2013.01); *B01D 46/0002* (2013.01); *B01D 46/2414* (2013.01); *F02M 35/0201* (2013.01); *F02M 35/02458* (2013.01); *F02M 35/02483* (2013.01); *B01D 2265/025* (2013.01); *B01D 2265/026* (2013.01); *B01D 2265/029* (2013.01)

(58) Field of Classification Search
CPC ............ B01D 46/0005; B01D 46/2414; B01D 46/0019; B01D 46/521; B01D 2201/291; B01D 2275/201; B01D 46/0002; B01D 2265/025; F02M 35/0201; F02M 35/0245; F02M 35/02416; F02M 35/02483
USPC ......... 55/520, 482, 491, 498, 502, 503, 490, 55/484, 529; 210/342, 338, 487, 497; 220/4.22, 4.33, 7, 284, 780
See application file for complete search history.

(56) References Cited

U.S. PATENT DOCUMENTS

| | | | |
|---|---|---|---|
| 6,402,798 B1 * | 6/2002 | Kallsen | B01D 35/30 220/293 |
| 7,850,756 B1 * | 12/2010 | Senetar, III | B01D 46/0004 210/338 |
| 8,216,335 B2 | 7/2012 | Scott et al. | |

(Continued)

FOREIGN PATENT DOCUMENTS

EP 1 207 295 A1 5/2002

*Primary Examiner* — Minh Chau T Pham
(74) *Attorney, Agent, or Firm* — Reinhart Boerner Van Deuren P.C.

(57) ABSTRACT

An air filter, an air filter assembly, and method of installing the air filter into a housing of the air filter assembly are provided. The air filter includes an attachment portion and a lock tab. The lock tab is carried by and resiliently moveable relative to the attachment portion. The lock tab is located radially outward from the attachment portion and movable circumferentially about a central axis of the air filter. Another feature relates to using an end stop in a housing as a catch. Yet another feature relates to using a perforated end cap and capping such perforations with a housing seal.

19 Claims, 7 Drawing Sheets

(56) References Cited

U.S. PATENT DOCUMENTS

| | | | |
|---|---|---|---|
| 2001/0010297 A1 | 8/2001 | Pulek et al. | |
| 2008/0190082 A1* | 8/2008 | Scott | B01D 46/0005 55/520 |
| 2009/0049814 A1* | 2/2009 | Baseotto | B01D 46/009 55/482 |
| 2009/0094951 A1* | 4/2009 | Baseotto | B01D 46/0024 55/498 |
| 2009/0145095 A1 | 6/2009 | Juliar et al. | |
| 2012/0067014 A1* | 3/2012 | Dhiman | B01D 46/008 55/399 |
| 2012/0210683 A1 | 8/2012 | Gillenberg et al. | |
| 2016/0114275 A1* | 4/2016 | Schwartz | B01D 46/0024 55/488 |
| 2016/0375391 A1* | 12/2016 | Adamek | B01D 46/0024 55/493 |

\* cited by examiner

AIR FILTER WITH CANTILEVER TAB AND ENGINE AIR FILTER ASSEMBLY INCORPORATING SAME

FIELD OF THE INVENTION

The present disclosure generally relates to air filter cartridges, and more particularly relates to locking mechanisms associated with such air filter cartridges, air cleaner assemblies and methods associated with such air filter cartridges.

BACKGROUND OF THE INVENTION

Air filters are commonly used in a variety of engine applications to filter the combustion air at the air intake to avoid dust and other contaminants from reaching the engine. Such an air cleaner assembly, for example, is provided in U.S. Pat. No. 8,216,335 to Scott et al. (entitled "AIR CLEANER; REPLACEABLE FILTER CARTRIDGE; AND METHODS"), the entire disclosure of which is hereby incorporated by reference as it illustrates the type of housings to which the improved air filter according to the embodiments of the present invention can be replaceably installed and removed when spent. Accordingly, U.S. Pat. No. 8,216,335 to Scott et al. discloses air cleaner housings for which embodiments of the present invention are usable.

As shown generally in U.S. Pat. No. 8,216,335, such air cleaner assemblies typically comprise a cover/lid that is mounted on an air cleaner housing and encloses a primary filter and a secondary filter therein. At the cover end, some air cleaners as in the '335 Patent have a projection receiver arrangement that is proposed to facilitate interlocking relationship between the air filter cartridge and the housing cover lid. At the other end, the housing includes a holder structure that includes four evenly spaced holder structures, one corresponding to corresponding structure on the filter cartridge. For example, each holder structure is sized to pass through a corresponding gap formed in the filter cartridge. Each holder structure is disclosed as having a circumferentially extending surface segment as well as an end stop that projects axially. The circumferentially extending surface segment may extend or be shaped as a cam to slant toward the outlet. Further details of such holder structures and corresponding filter cartridge features can be had with reference to the '335 Patent.

Embodiments of the present invention can be usable with such air cleaner housings as disclosed in the '335 Patent and/or in other such applications. The present invention provides for improvements over the state of the art.

BRIEF SUMMARY OF THE INVENTION

In one aspect, an embodiment of the present invention a resiliently movable lock tab feature on an air filter. Such an air filter comprises a tubular ring of an air filter media extending about a central filter axis and having a first end and a second end. The tubular ring defines an internal volume with a first end cap sealingly coupled to the first end and a second end cap at the other end. The second end cap comprises: (a) an attachment portion sealingly coupled to the second end of the filter end of the filter media, and (b) a lock tab that is carried by and resiliently movable relative to the attachment portion radially outward therefrom and circumferentially about the central filter axis.

According to a more specific embodiment of a second end cap for an air filter, the attachment portion thereof comprises an adhesive material and a support ring. The adhesive material forms a sealing attachment with the tubular ring, and the lock tab is integrally connected to the support ring.

According to a more specific embodiment of an end cap for an air filter, the lock tab can comprise a support arm integrally connected to the support ring at an anchor base that extends in a circular arc direction around the support ring in a cantilever manner. A circular arc gap is formed therebetween to facilitate spring resiliency in the support arm. A lock member is provided at an end of the support arm opposite the anchor base.

According to a more specific embodiment, the support arm is formed from plastic material and the lock member is movable at least 0.5 millimeters relative to the support ring. To provide such resilient movement and to allow manual installation, the support arm can comprise the following dimensions: (a) a minimum axial thickness of at least 1.5 millimeters; (b) a minimum radial thickness of between 1.5 millimeters and 25 millimeters; and (c) an angular span about the central filter axis of between 5 degrees and 45 degrees, at a radius relative to the central filter axis of between 5 centimeters and 30.5 centimeters.

According to a more specific embodiment, the end of the support arm opposite the anchor base can comprises a ramp surface facing axially toward the first end cap and that extends at an incline of between 5 degrees and 45 degrees relative to a plane perpendicular to the central filter axis. Further such arm end may comprise a slot facing axially toward the first end cap and positioned circumferentially between the ramp surface and the anchor base with a tooth being formed at a juncture between the slot and the ramp surface to provide the lock member.

According to a more specific embodiment of an end cap, the support ring thereof comprises an outer annular wall, an inner annular wall and an annular base wall interconnecting the inner annular wall and the outer annular wall to collectively define an annular potting well, with the adhesive material in the potting well.

According to a more specific embodiment of such end cap, the annular base wall is perforated with apertures, with adhesive material extending through the apertures.

According to a more specific embodiment of such end cap, a preformed gasket ring can be supported on the support ring on an opposite side of the potting well.

In an embodiment, such as gasket ring can be configured as an axial seal.

According to a more specific embodiment of such end cap that incorporates such a gasket, the annular base wall defines a groove receiving the preformed gasket ring. The groove is defined by a pair of annular side walls that encompass the apertures. The gasket ring caps the apertures to prevent or limit the adhesive material from being exposed on the opposite side of the potting well (e.g. so as not to interfere with the axial sealing of gasket with the housing when in use). Further, the adhesive material can secure the gasket ring to the support ring.

According to a more specific embodiment of an air filter having end cap with a lock tab, the lock tab comprises: a ramp surface, a slot, and a tooth being formed at a juncture between the slot and the ramp surface to provide a lock member. Further, the lock tab is configured to install in a predetermined rotational install direction with the ramp surface at a front location for first engagement relative predetermined rotational install direction with the tooth and slot located, in trailing sequence.

According to a more specific embodiment of an air filter having end cap with a lock tab, the lock tab comprises a plurality of individual lock tab members arranged in a spaced relation at regular angular intervals about the central filter axis.

According to a more specific embodiment of an air filter having end cap with a lock tab, wherein the first end cap is closed and the second end cap is open.

According to a more specific embodiment of an air filter having end cap with a lock tab, the tubular ring of air filter media is a frusto-conical pleated tubular ring.

According to a more specific embodiment of an air filter having end cap with a lock tab, the tubular ring is a pleated tubular ring comprising a pleat depth of between 0.5 centimeter and 13.0 centimeters, and a maximum outer diameter of between 7.5 and 64.0 centimeters.

According to a more specific embodiment, a typical air filter media suitable for engine air intake filtration to prevent dusting of an engine comprises: at least one of cellulose fibers or polymeric fibers, and an initial filtration efficiency of at least 95% and a cumulative filtration efficiency of at least 99% (the filtration filtrations efficiencies being measured according to standard ISO5011-2014).

Another aspect according to a more specific embodiment of the present invention is the combination the air filter with such a lock tab with an air cleaner housing to provide an air cleaner housing assembly. Such a combination further comprises a housing assembly comprising an air flow inlet and an air flow outlet. The housing assembly comprises a housing having an open end that is adapted to receive the air filter, and a cover closing the open end with the air filter housed in the housing assembly. The housing defines a base end and an annular sidewall projecting axially from the base end in surrounding relation of the central filter axis with the air filter housed therein. The base end defines one of the air flow inlet and the air flow outlet. The annular sidewall internally defines a plurality of catches at angular intervals about the central filter axis and proximate the base end. Each catch defines a rib that projects in a circumferential arc segment about the central filter axis and an end stop that projects toward the base end at an end of the rib. Further, the lock tab comprises at least one individual lock tab member engaging with a corresponding at least one of the catches.

More typically in such an embodiment, multiple individual lock tab members engage with corresponding catches at different angular intervals about the central axis.

According to a more specific embodiment of an air cleaner assembly, each individual lock tab member can comprise a ramp surface, a slot, and a tooth that is formed at a juncture between the slot and the ramp surface to provide a lock member. The end stop of the housing may not merely act as a stop but also can project into the slot when in a rotationally installed position of the air filter in the housing assembly.

According to a more specific embodiment of an air cleaner assembly, the air filter comprises a housing sealing gasket integrally connected to the second end cap. The housing sealing gasket is axially sealing against an internal sealing housing sealing surface defined by the base end of the housing.

According to another aspect of an embodiment of the present invention, a new method of filter installation is provided. The method comprises: (A) providing a housing assembly comprising an air flow inlet and an air flow outlet, with the housing assembly comprising a housing having an open end, and a cover adapted to close the open end, the housing defining a base end and an annular sidewall projecting axially from the base end in surrounding relation of a central filter axis, the base end defining one of the air flow inlet or the air flow outlet, the annular sidewall internally defining a plurality of catches at angular intervals about the central filter axis and proximate the base end, each catch defining a rib projecting in a circumferential arc segment about the central filter axis and an end stop projecting toward the base at an end of the rib; (B) providing an air filter, the air filter comprising an assembly of component parts including an air filter media; a lock tab including a ramp surface, a slot, and a tooth being formed at a juncture between the slot and the ramp surface to provide a lock member; and a gasket member; (C) installing the air filter through the open end along the central filter axis into the housing assembly with the air filter media arranged to filter air flow between the air flow inlet and the air flow outlet; (D) rotating the air filter such that the ramp surface engages the end stop and continuing to rotate until the end stop projects into the slot to rotationally and axially lock the air filter and the housing; (E) sealing between the air filter and housing to prevent to prevent unfiltered air flow between the air flow inlet and the air flow outlet without passing through the air filter media; and (F) closing the open end with the cover.

According to a more specific embodiment of such method, the provided air filter can further comprise a support ring secured to the air filter media with the lock tab being integrally connected to the support ring. The lock tab can comprise a support arm integrally connected to the support ring at an anchor base and that extends in a circular arc direction around the support ring in a cantilever manner with a circular arc gap therebetween to facilitate spring resiliency in the support arm, with the lock member at an end of the support arm opposite the anchor base. With such structure, the method can further comprise: resiliently flexing the support arm during engagement between the end stop and the ramp to bend the support arm axially until the end stop passes the tooth allowing the support arm to resiliently snap back with the end stop received in the slot.

According to another aspect of an embodiment of the present invention, an air filter is provided with a gasket capping feature. The filter comprises a tubular ring of an air filter media extending about a central filter axis to have a first end and a second end. The tubular ring defines an internal volume. A first end cap sealingly coupled to the first end of the tubular ring of air filter media. A second end cap is sealingly coupled to the second end of the tubular ring of air filter media. The second end cap comprises an adhesive material and a support ring. The support ring comprises an outer annular wall, an inner annular wall and an annular base wall interconnecting the inner annular wall and the outer annular wall to collectively define an annular potting well. The adhesive material is in the potting well and sealingly couples with the tubular ring. Further, the annular base wall is perforated with apertures with the adhesive material extending through the apertures. A preformed gasket ring is supported on the support ring on an opposite side of the potting well capping the apertures to prevent or limit the adhesive material from being exposed on the opposite side of the potting well (e.g. so as to prevent adhesive material from interfering with sealing between the filter and the housing when in use).

For example, the gasket ring can be configured as an axial seal.

According to a more specific embodiment, the annular base wall defines a groove receiving the preformed gasket ring. The groove is defined by a pair of annular side walls that encompass the apertures. The adhesive material connects the gasket ring to the support ring.

According to a more specific embodiment, such an end cap can comprises a lock tab radially outward of the support ring and circumferentially about the central filter axis. The lock tab may have any of the features disclosed herein above or below.

According to a more specific embodiment of a typical air filter according to various embodiments, the tubular ring is a pleated tubular ring and further comprises an outer support cage and an inner support cage. The outer support cage can extend closely around the pleated tubular ring with the inner support cage being closely surrounded by the pleated tubular ring.

In an embodiment where cages are used, the support ring can define at least standoff within the potting well for positioning of at least one of the pleated tubular ring, the inner support cage and the outer support cage.

According to another aspect of an embodiment of the present invention, an air filter is provided with a lock tab feature. The air filter comprises an air filter media extending along a central filter axis and having a first end and a second end. A first end cap is at the first end and a second end cap at the second end. The second end cap comprises an adhesive material and a support member and a lock tab. The lock tab is supported by the support member radially outward of the support member and circumferentially about the central filter axis. The lock tab comprises: a ramp surface, a slot, and a tooth that is formed at a juncture between the slot and the ramp surface to provide a lock member. The lock tab is configured to install in a predetermined rotational install direction with the ramp surface at a front location for first engagement relative to the predetermined rotational install direction with the tooth and slot located, in trailing sequence.

Preferably, in a more specific embodiment, the lock member is resiliently moveable relative to the support member. For example, such a lock tab may have any of the features disclosed herein above or below.

Other aspects, objectives and advantages of the invention will become more apparent from the following detailed description when taken in conjunction with the accompanying drawings.

BRIEF DESCRIPTION OF THE DRAWINGS

The accompanying drawings, incorporated in and forming a part of the specification, illustrate several aspects of the present invention and, together with the description, serve to explain the principles of the invention. In the drawings:

FIG. 5A is an enlarged cross-section view of a portion of the cross-section taken about section A-A in FIG. 5.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
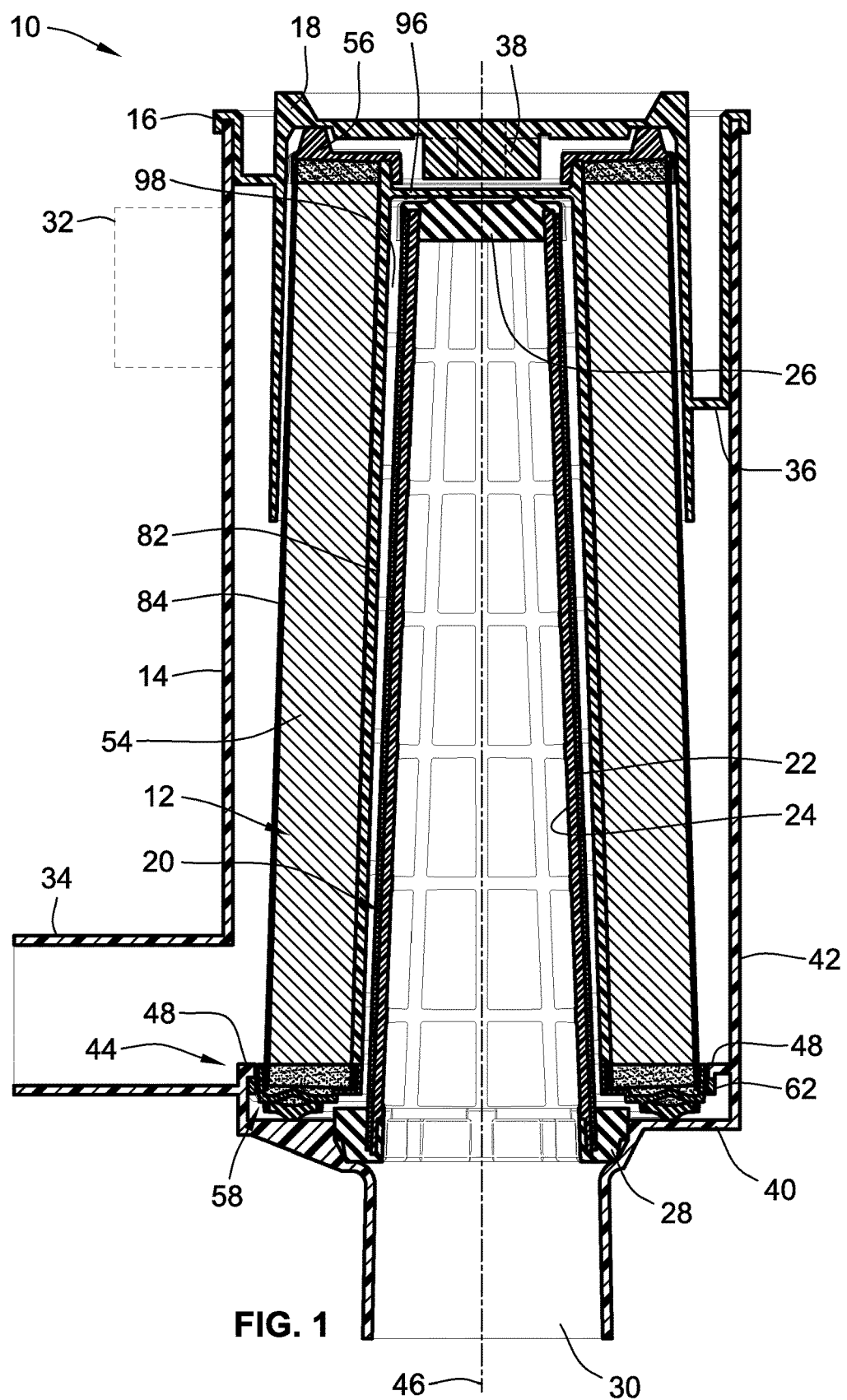
FIG. 1 is a cross-sectional view of an air cleaner assembly including a primary air filter, and a secondary air filter installed in an air cleaner housing assembly that comprises a generally cylindrical housing and a lid that are coupled together to enclose the air filters therein, in accordance with an embodiment of the present invention.

Turning to FIG. 1, an air cleaner assembly 10 is illustrated including a primary air filter 12 according to an embodiment of the present invention. Air cleaner assembly 10 also includes a housing assembly comprising a housing 14 having an open end 16 for receipt of the primary air filter 12, and a cover 18 that closes the open end 16 to encase the primary air filter 12 within the housing 14. Further, a secondary air filter 20 may be provided that can be removably received within the primary air filter 12, and that may separately seal at the bottom end against the housing 14.

The secondary air filter may serve the purpose of filtering the air and plugging quickly in the event the primary air filter 12 fails. Thus, the secondary air filter 20 provides for backup of the primary air filter 12. Usually, the secondary air filter will have a much lower filtration efficiency than the primary air filter 12. Secondary air filter 20 may include a tubular ring of filter media 22 around a tubular support 24, together which are embedded in top closed end cap 26 and bottom open end cap 28 at opposite ends thereof. The bottom end cap 28 may be made from soft resilient foam urethane material that can form an internal seal either axial or radial with the housing 14 at the bottom end thereof. In this manner, air flowing through the air cleaner housing assembly cannot reach the outlet without passing through the filter media 22 of the secondary air filter.

Figure 2:
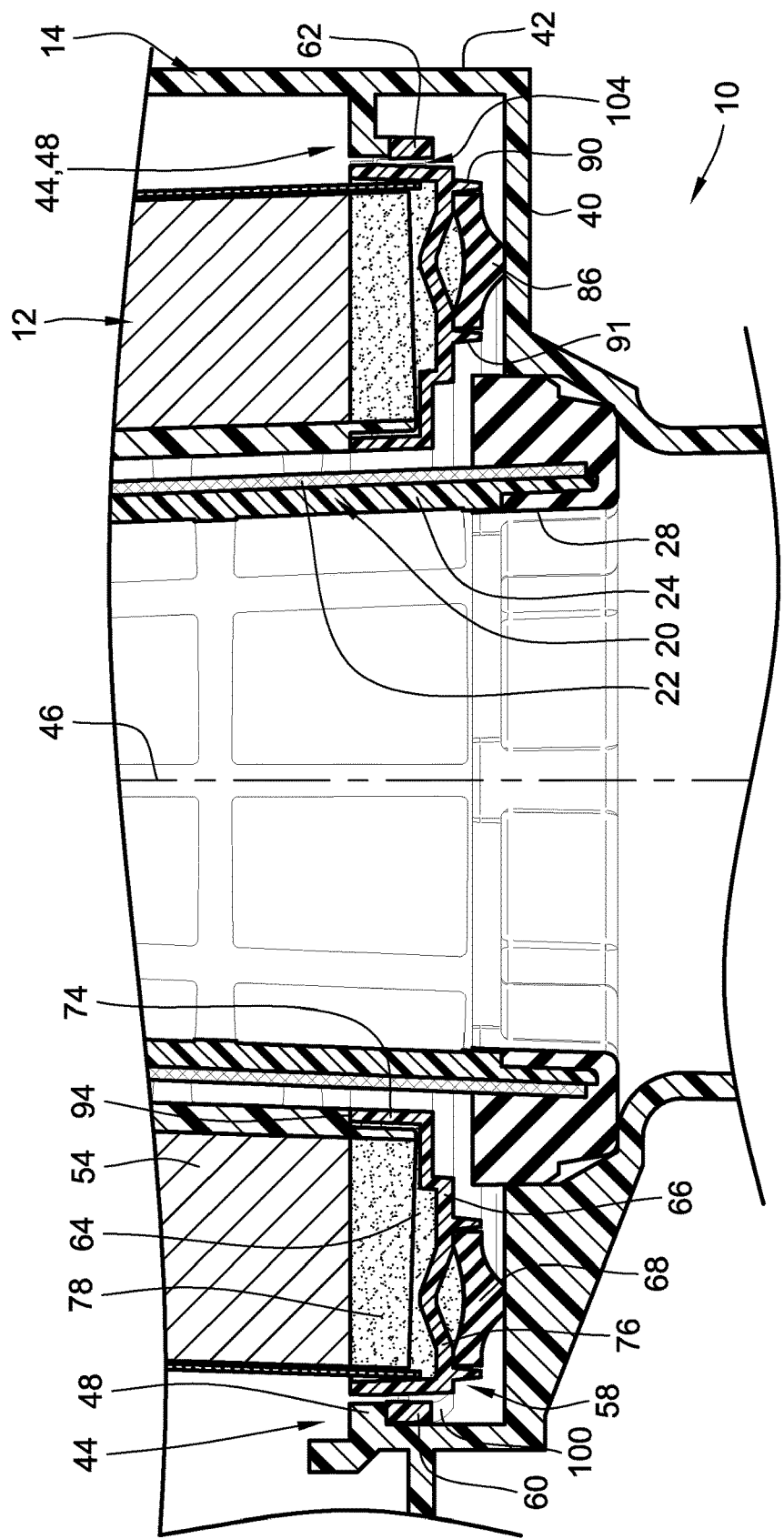
FIG. 2 is an enlarged view of a lower portion of the assembly shown in FIG. 1.

As can be seen in FIGS. 1 and 2, the housing assembly, including housing 14 and cover 18, define an air outlet 30 for clean filtered air, an air inlet 32 for raw unfiltered air, and an ejector port 34. The ejector port 34 may discharge large objects that can be centrifugally separated due to the vortex or swirling of air that can be caused by a vane structure 36. The primary air filter 12 and the secondary air filter are arranged fluidically in series between the air inlet 32 and the air outlet 30. The housing cover 18 may optionally include a mating projection 38 as is the case on various existing air cleaner housing assemblies such as shown in the aforementioned '335 Patent. However, in this case, no corresponding receiver arrangement is provided and instead the primary air filter 12 is devoid of interacting locking structure with the cover's mating projection 38, and simply provides clearance for the mating projection 38 in accordance with one feature of an embodiment. In alternative embodiments, such a corresponding receiver may be provided, as in the '335 Patent, but it is not necessary for proper interaction and locking due to other features provided on the primary air filter 12 as in the illustrated embodiment herein.

The housing defines a base end 40 that can define the air outlet 30 with an annular sidewall 42 that projects axially upward from the base end 40 to define open end 16 that can be closed by cover 18.

Figure 3:
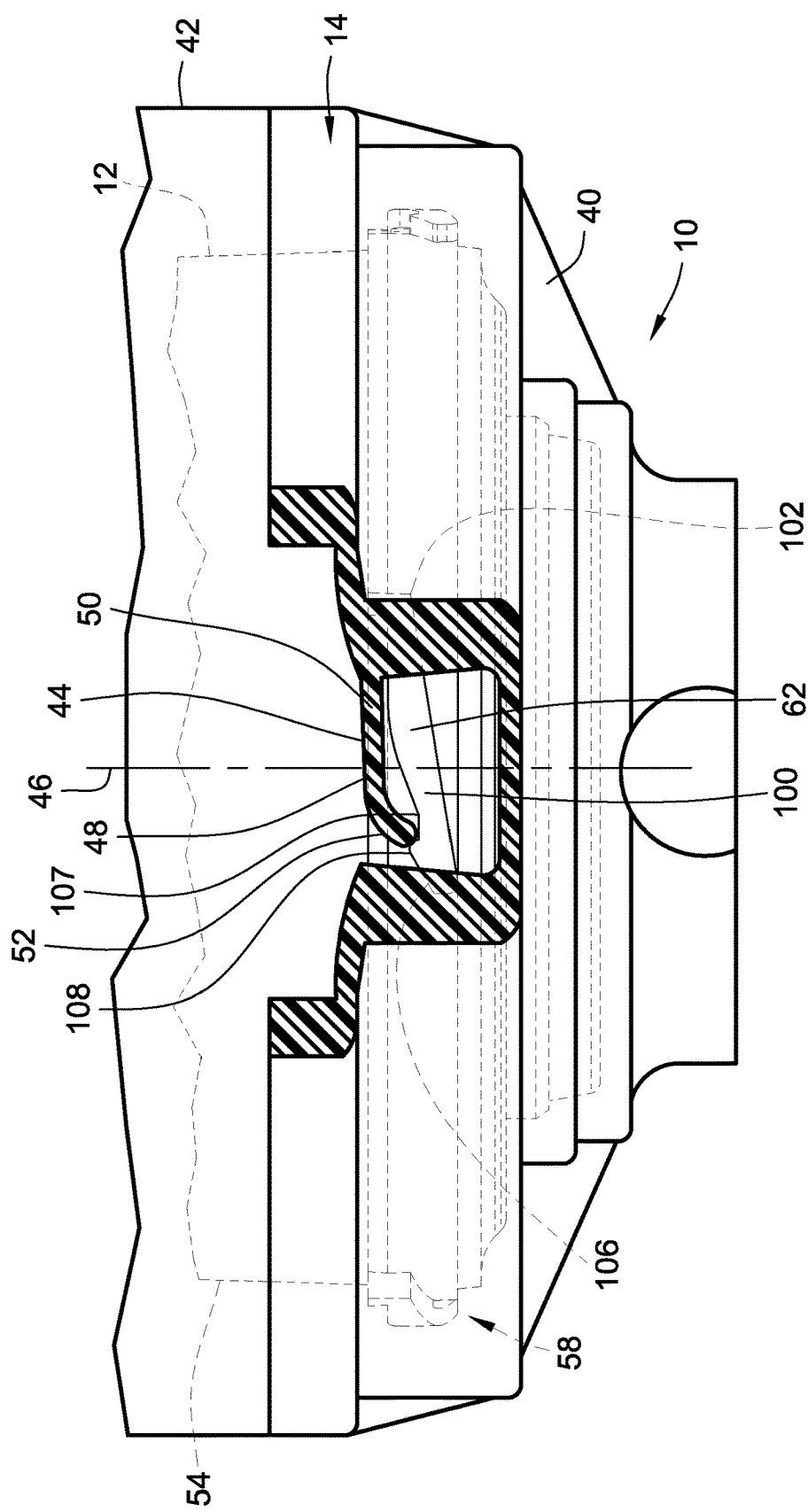
FIG. 3 is a side elevation view of the lower portion of the air cleaner assembly of that shown in the previous figures and similar to the view shown in FIG. 2, but only with a very limited outer wall segment portion of the air cleaner housing being shown in cross-section and much of the primary air filter being shown in dashed lines.

As shown best in FIGS. 2 and 3, the annular sidewall 42 can define a holding structure such as a plurality of catches 44 that can be arranged at angular intervals about the central filter axis 46 and preferably equal angular intervals. These catches 44 are arranged proximate the base end 40, with each catch 44 defining a rib 48 projecting in a circumferential arc segment 50 (understanding that the arc segment may extend slightly angled along a ramp camming surface such as described in the '335 Patent and also as shown herein). Further, each catch 44 defines an end stop 52 connected to the arc segment 50 and projecting toward the base end 40 at the end of the rib 48. This end stop 52 extends substantially in an axial direction and faces the base end 40 so as to provide an abutment extending from arc segment 50 to provide structure that can stop filter cartridge overrotation. The arc segment 50, in contrast, extends circumferentially around forming an arc segment of a circular path. In any event, arc segment 50 and stop 52 segment extend in transverse directions.

With additional reference to FIG. 1, the cover 18 is securable to the housing 14 with latches or other mechanism to apply an axial force upon the primary filter 12 which pushes the primary air filter 12 into axial sealing engagement with the base end 40 of the housing 14. This prevents bypass or leakage between the air inlet and air outlet. Additionally, the primary air filter 12 may act axially upon the secondary air filter 20 to keep the secondary air filter 20 sealing engaged with the base end 40 of the housing 14 as well.

Figure 4:
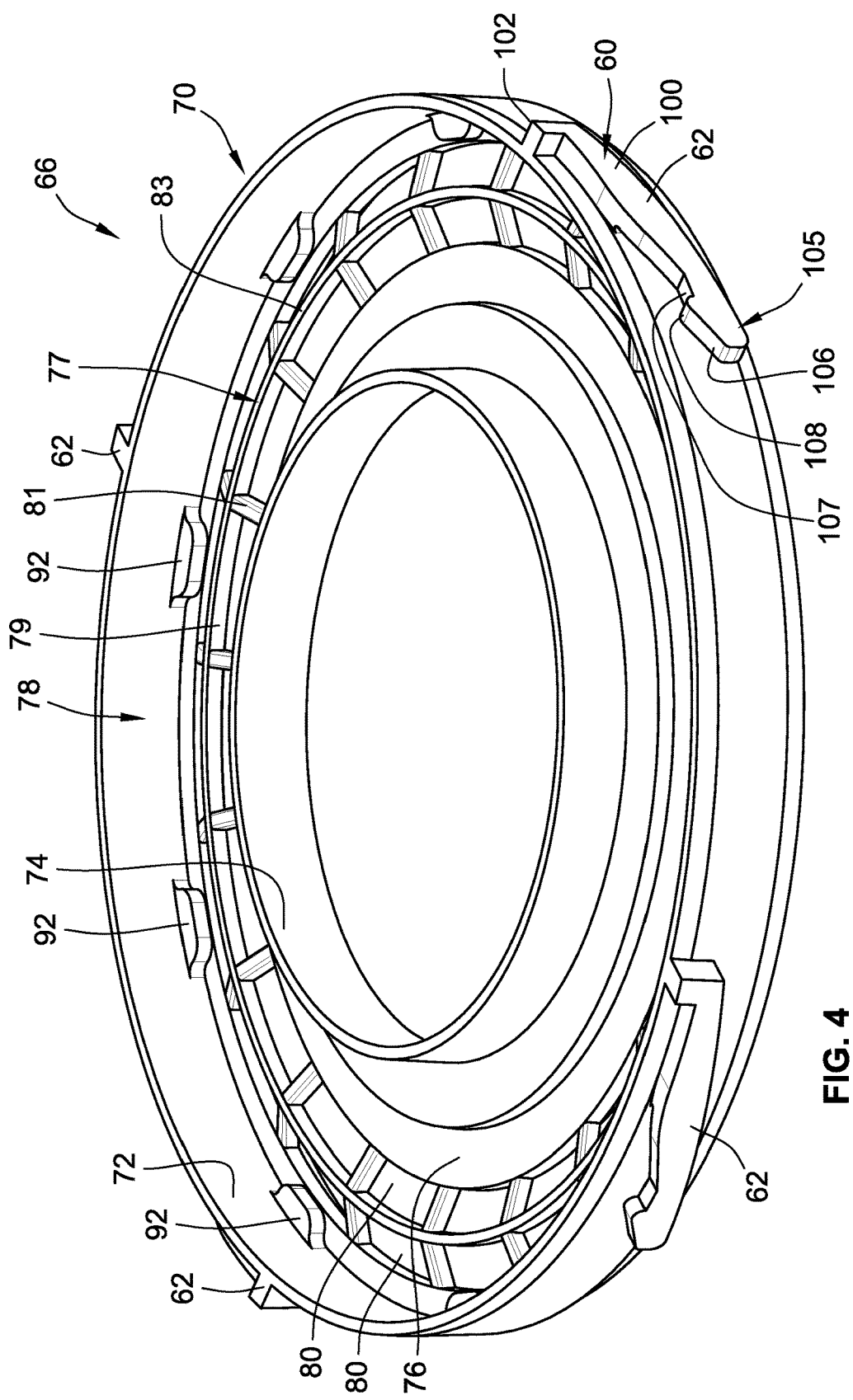
FIG. 4 is an isometric top angled view of a support ring for the bottom end cap used in the primary air filter illustrated in FIGS. 1-3.
Figure 5:
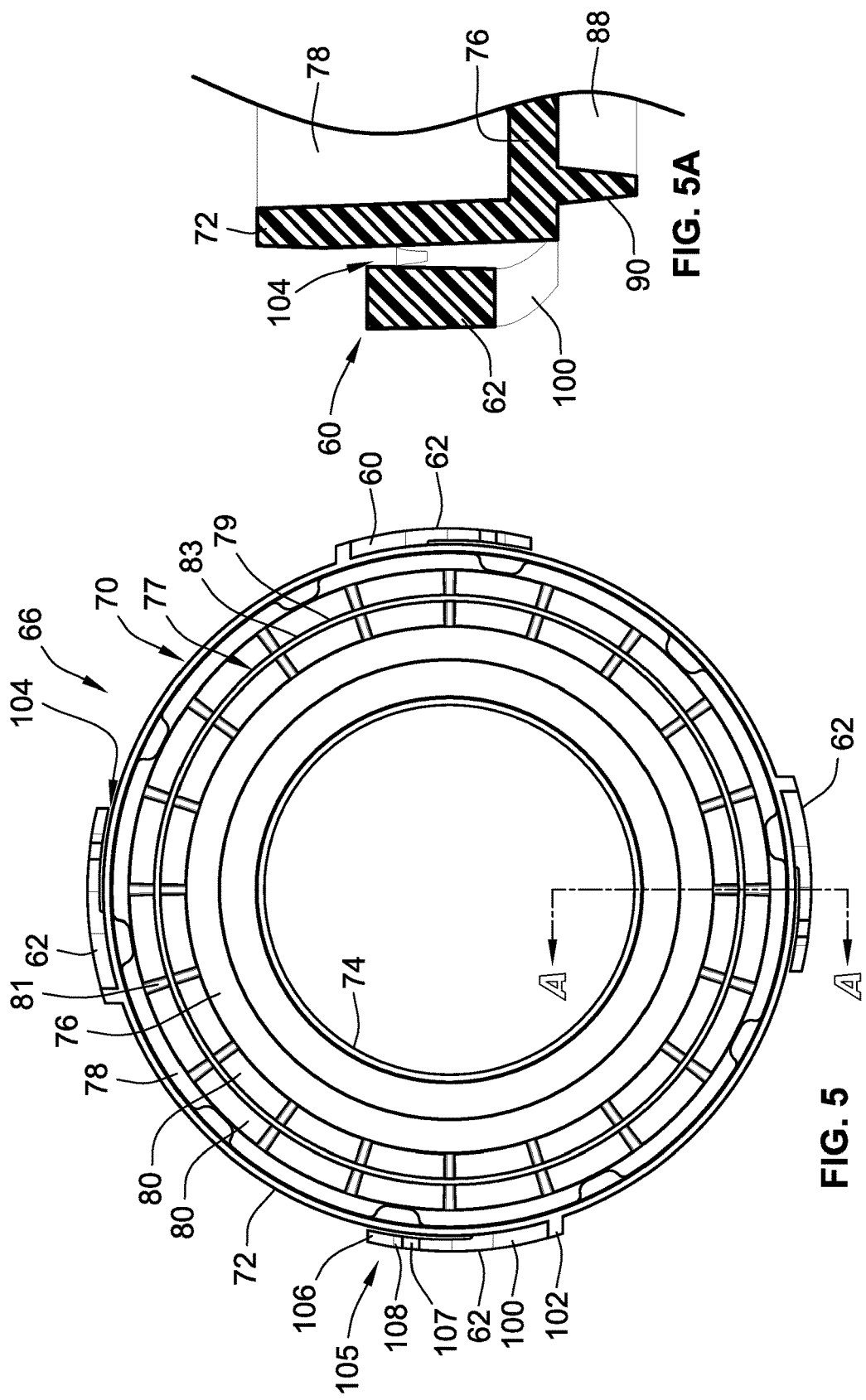
FIG. 5 is a top view of the end cap support ring illustrated in FIG. 4.
Figure 6:
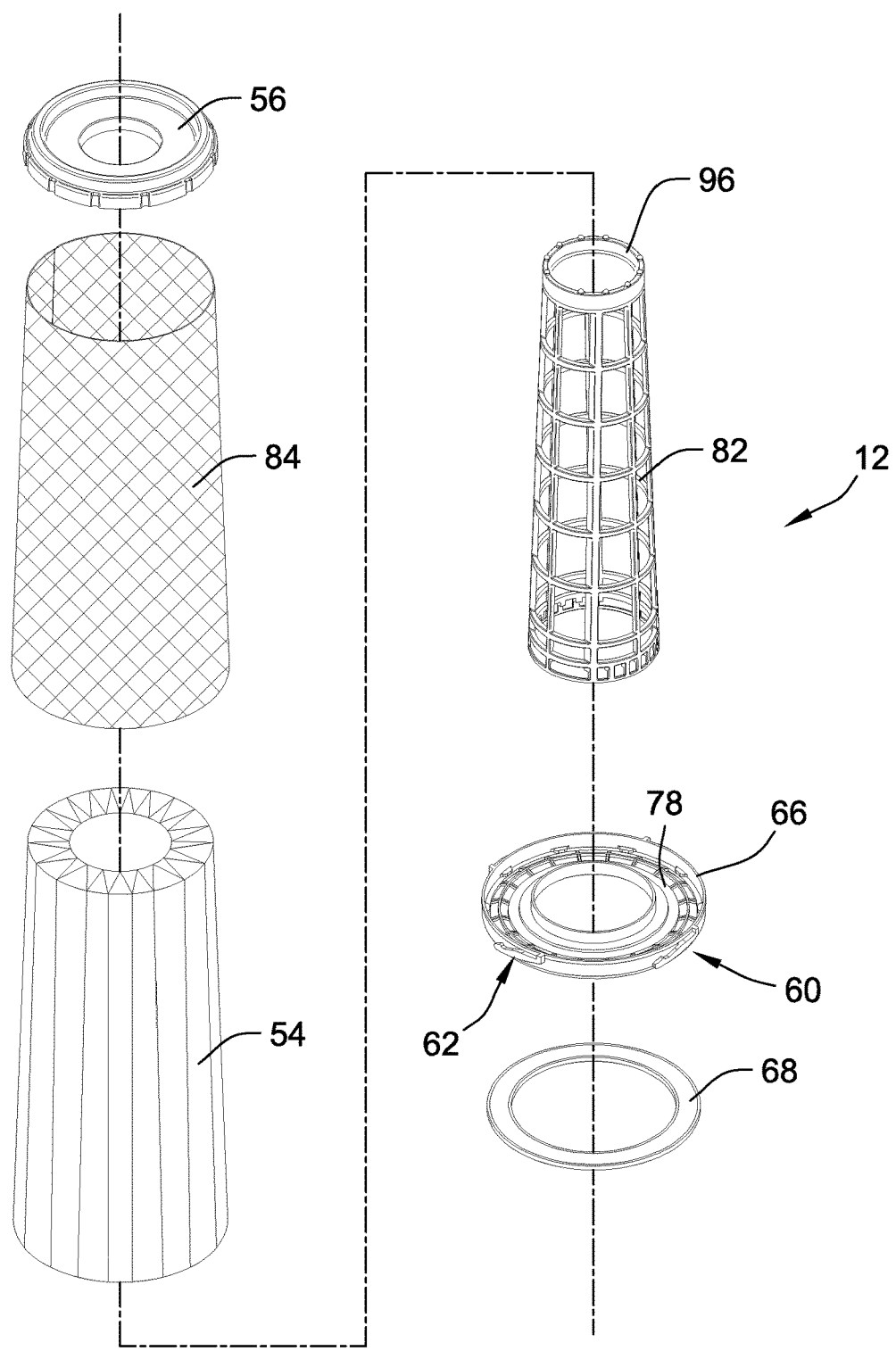
FIG. 6 is a similar exploded assembly view of the primary air filter shown in FIG. 6, but with the components being viewed from an isometric top side as opposed to bottom side view.
Figure 7:
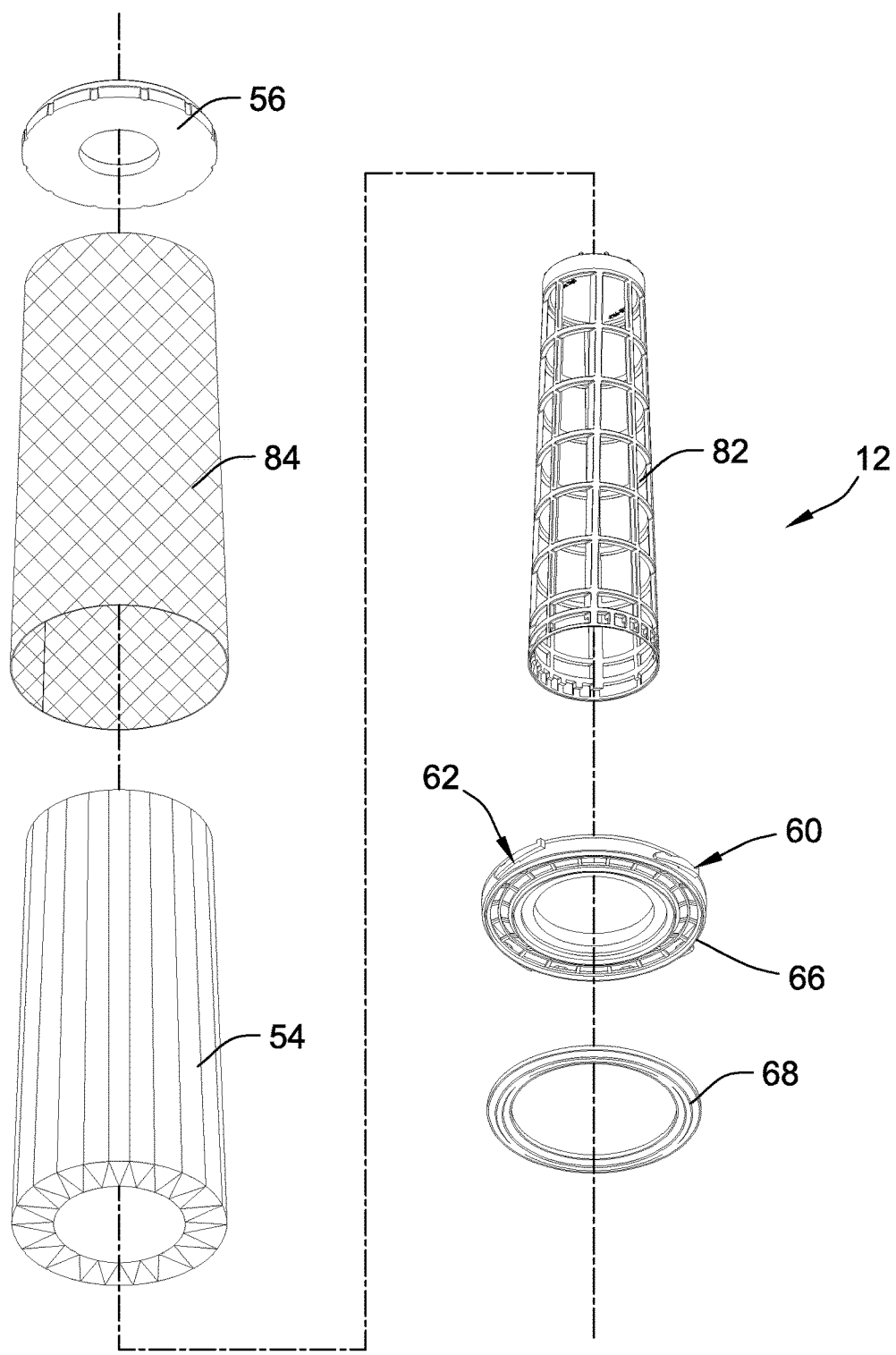
FIG. 7 is an exploded assembly view of the primary air filter shown in FIGS. 1-3 and illustrating an isometric bottom side of the various components.

Now that detail to the overall air cleaner assembly 10 has been reviewed, further focus upon the primary air filter 12 will be had, where the components of the primary air filter 12 are illustrated in FIGS. 6 and 7, and the bottom end cap's support ring being illustrated in greater detail as a component part in FIGS. 4, 5 and 5A.

In general, the primary air filter 12 includes a tubular ring of air filter media 54, that is preferably pleated, that extends about a central filter axis 46 (understanding that the filter axis 46 is the central axis that can be defined by any of the primary air filter 12, air cleaner housing 14 and/or secondary air filter 20). Air filter 12 also comprises a first end cap 56 that is sealingly coupled to an upper first end of the tubular ring of air filter media 54 and a second bottom end cap 58 that is sealingly coupled to a second lower end of the tubular ring of air filter media 54. The bottom end cap 58 preferably incorporates an assembly of components to provide an attachment portion that sealingly couples to the lower end of the filter media and separately a lock tab 60 that may comprise a plurality of regularly spaced and preferably evenly spaced individual lock tab members 62. Reference will generally be had to lock tab 60 while understanding that one or more of such individual lock tab members 62 may be provided to provide for such lock tab.

In an embodiment, the lock tab 60 is carried by and resiliently movable relative to the attachment portion of the bottom end cap 58 at a location radially outward therefrom and circumferentially about the central filter axis in order to interact and co-act with the corresponding catches 44 provided by the air cleaner housing 14 as can be seen with reference to FIGS. 2 and 3.

To provide for both the attachment portion and the lock tab 60 of the bottom end cap 58, the bottom end cap 58 may comprise a plurality of components in an assembly. Such an endcap assembly can include: (1) a suitable adhesive material 64 (for example foam polyurethane or alternatively plastisol or other adhesive material) that forms a sealing attachment with the pleated tubular ring of the air filter media 54; (2) a more rigid but yet resilient support ring 66 (e.g. that may be a plastic injection molded part) that provides supporting structure for the lock tab 60; and optionally (3) a gasket ring 68 that is formed of suitable sealing material such as a urethane, nitrile, or other suitable rubber like material and may be softer and more compressible than the support ring 66. Gasket ring 68 is suitable for forming a sufficient seal to prevent dirt from bypassing the primary air filter 12 between the air outlet 30 and air inlet 32 when installed in the air cleaner assembly.

The lock tab 60 is integrally connected to the support ring 66 and thereby forms an overall support ring assembly 70 that is preferably a one-piece unitary component such as formed by plastic injection molding from suitable resilient plastic material. Suitable resilient plastic material is preferred in order to allow the lock tab 60 to be carried by and yet resiliently movable relative to the remainder of the bottom end cap 58.

While a separate gasket ring 68 is provided, it is also envisioned that the adhesive material 64 such as in the case of a foamed polyurethane material could alternatively be molded to provide an axial seal or other such seal provided by the bottom end cap 58 for sealing against the air cleaner housing 14, in an alternative embodiment of the present invention. However, the axial gasket ring 68 in the present embodiment avoids the necessity for having molds provided for formation of the bottom end cap 58. In particular, it can be seen with reference to FIGS. 4-7, that the support ring 66 comprises an outer annular wall 72, an inner annular wall 74 and an annular base wall 76 interconnecting the inner annular wall 74 and the outer annular wall 72 that collectively define an annular potting well 78.

Within the potting well 78 may be a filter media standoff structure that can be provided by a circular ribbed network 77. The circular ribbed network 77 has a rib ring 79 and radial rib members 81 that are radially extending from the rib ring 79. In one embodiment, the rib ring 79 axially extends further away from the annular base wall 76 than the radial rib members 81 in order to provide an annular elevated ridge portion 83. In one embodiment, the annular elevated ridge portion 83 will abut against and support a tubular ring of air filter media 54 when the tubular ring of air filter media 54 has been inserted into the potting well 78. As will be understood, this elevates the tubular ring of air filter media 54 above the bottom of the support ring 66, which allows for adhesive material 64 to readily flow around the tubular ring of filter media 54 and the support ring 66.

The potting well 78 receives and contains the adhesive material 64 while in the uncured state and during assembly to facilitate sealing attachment to the tubular ring of air filter media 54. While the adhesive material 64 contained in the potting well 78 is still in the liquid or uncured state, the end of the tubular ring of air filter media 54 can be dipped into and embedded within the adhesive material 64 thereby forming a sealing coupling all the way around and throughout the region of the bottom end of the tubular ring of air filter media 54 within the potting well 78.

An inner support cage 82 and outer support cage 84 can optionally be provided and potted in the well 78 with adhesive material 64. Cages 82 and 84 provide rigidity and more support to the overall primary air filter 12, and/or provide for protecting the inner or outer surfaces of the pleated tubular ring of air filter media 54 to prevent damage or inadvertent perforations of the air filter media.

While in an alternative embodiment the potting well maybe self-contained and unperforated, preferably, the annular base wall 76 is perforated with apertures 80. In one embodiment, the apertures 80 are defined by the rib ring 79 and radial rib members 81 of the circular ribbed network 77. In a preferred embodiment, the adhesive material 64 will extend through the apertures 80 to better interlock and retain the support ring 66 to the tubular ring of air filter media 54.

The housing sealing gasket ring 68 may additionally serve the purpose of preventing or sealing off the apertures 80 along the bottom side of the bottom end cap 58. For example, the preformed gasket ring 68 is shown to be supported on the support ring 66 on an opposite side of the potting well 78. Thus, the gasket ring 68 may also serve to close off and prevent excessive adhesive material 64 from flowing to the underside of the bottom end cap 58 in a manner that would impede sealing at the bottom end. For example, the annular base wall 76 of support ring 66 can define a groove 88 between projecting axial walls 90, 91 along the bottom side of the support ring 66 which closely receives the gasket ring 68 therein. For example, the gasket ring 68 is preferably of more resilient and compressible material than the plastic, and typically more rigid. Yet resilient material of the gasket ring 68 can be wedged into place within the groove 88. It can be seen that the axial sidewalls 90, 91 encompass the apertures 80 therebetween such that the gasket ring 68, when installed in the groove 88, caps the apertures 80 to prevent or limit the adhesive material from being exposed on the bottom side of the bottom end cap 58. Further in this fashion, the adhesive material 64 may therefore also adhesively attach and prevent ready detachment of the gasket ring 68 from the support ring 66. This better ensures that the gasket ring 68 does not inadvertently become dislodged, and maintains the correct position of the gasket ring 68 for proper sealing relation with the air cleaner housing 14.

The gasket ring is configured preferably as an axial seal. For example, gasket ring 68 includes a circular sealing ridge 86 that projects axially and is compressible or alternatively resiliently deflectable in the axial direction to facilitate sealing along a common sealing plane that is defined by the base end 40 of the air cleaner housing 14.

Further features of the potting well 78 include at least one standoff comprising standoff members 92 that are defined at different angular locations about the central axis and around the potting well 78 along either the outer or inner annular wall. In this case, standoff members 92 are along the outer annular wall 72 and provide a ledge for elevating the outer support cage 84 axially above the base wall 76 to facilitate better adhesion and flow of the adhesive material 64 during curing. The outer support cage 84 may comprise for example expanded metal mesh that can be formed into a cylindrical or in this case frustoconical support. Outer support cage 84 provides additional rigidity and support such that rotation applied to the top end cap 56 is transferred through the cage. The outer support cage 84 is also integrally embedded in the top end cap 56. Similarly, the inner support cage 82 can be provided by similar rigid material, but in this case may be relatively rigid plastic material. In this instance, standoffs may similarly be provided along the inner annular wall 74 or in this case a separate annular shoulder 94 is formed into a bottom end of the inner support cage 82 to provide a ledge upon which the inner support cage sits and seats against the top edge of the inner annular wall 74 of the support ring 66. As such, in a similar manner, the inner support cage 82 may be elevated slightly above the base wall 76 and can facilitate better adhesion of the inner support cage 82.

While not much detail has been provided to the top end cap 56, it is noted that the top end cap has embedded therein both the inner support cage 82 and the outer support cage 84. The top end cap 56 may be provided as a single one piece unitary molded component part such as formed by urethane material or other adhesive material that can provide a sealing coupling all the way around the tubular ring of air filter media 54 at the top end, or it can alternatively comprise an end cap ring with a potting well that can contain adhesive material and similarly be potted at the top end of the filter media similar to how the bottom end cap is attached. The top end cap 56 is closed by virtue of a central partition wall 56 that closes off the central volume 98 defined internal to the tubular ring of air filter media 54. Specifically, the partition wall 96 closes off the top end of that central volume 98. Partition wall 96 may be part of the inner support cage 82 to close the top end cap 56 and hence top end cap 56 may be referred to as a closed end cap. Notably, no such structure or corresponding receiver is provided for interacting with the mating projection 38, but instead the filter element is allowed to rotate freely relative to the housing cover 18 when installed in the air cleaner assembly 10. No rotational locking is provided at the top end. This simplifies the construction of the upper portion of the primary air filter 12.

Turning in greater detail to the lock tab 60, and referencing FIGS. 2-5 and 5A, lock tab 60 can be provided by one or more individual lock tab members 62. It can be seen that the lock tab 60 comprises a cantilever support arm 100 connected to the support ring 66 at an anchor base 102. The anchor base 102 projects radially outward from, and is integrally connected to, the support ring 66 to provide support for the support arm 100 and space the support arm 100 with a radial gap therebetween, thereby providing cantilever support. The support arm 100 extends in a circular arc direction (e.g. an arc segment of a circle) around the support ring 66 in a cantilever manner with a circular arc gap 104 therebetween to facilitate spring resiliency in the support arm due to the fact that the support arm and base are made from resilient plastic material. The extent of the support arm 100 provides for resiliency through the material (e.g. resilient plastic) such that support arm 100 is axially movable in a resilient manner relative to the remainder of the end cap at the bottom end (e.g. relative to the attachment portion and/or the support ring 66). The support arm has a lock member 105 at a forward leading end of the support arm that is opposite the location of the trailing anchor base 102. With this construction and for engine air filters for typical over-the-road diesel engines, the support arm 100 is readily movable without breaking or plastically deforming when moved within a range of at least ½ millimeter relative to the support ring. To provide for these features, the support arm can comprise a minimum axial thickness of at least 1.5 millimeters (e.g. measured at the slot 107), a minimum radial thickness of between 1.5 and 25 millimeters (dimension can be seen in the top view of FIG. 5), and an angular span about the central axis of between 5 and 45 degrees (and a radius of between 5 and 30.5 centimeters), which are viewable in FIG. 5. It is noted an axial thickness can be seen in FIG. 5 and typically the axial thickness of the support arm 100 is not greater than the height of the outer annular wall 72 of the support ring, and typically half or less than the height of outer annular wall 72.

The lock member is configured to interact and lock relative to one or more of the catches 44 provided at the bottom end of the air cleaner housing 14 which in reference to FIGS. 2 and 3 can be seen to include the catch rib 48 including a circularly extending arc segment 50 that may be partially ramped as well as a more pronounced end stop 52 that projects in the direction toward the bottom end, and that provides an axially extending projection. However, rather than being used as an end stop, the end stop 52 when used with the primary air filter 12 of the present embodiment can act as part of a snap configuration interacting with the resiliently movable locking tab 60 (e.g. any of the lock tab members 62) of the primary air filter.

Specifically, the locking member 105 may be provided with snap action such as may be facilitated by a forward ramp surface 106 facing axially toward the first end cap and extending at an incline of typically at least 5 degrees (typically between 5 and 45 degrees) relative to a plane perpendicular to the central filter axis 46; a slot 107 that also faces axially towards the first top end cap 56 and is positioned circumferentially between the ramp surface 106 and the anchor base 102 along the support arm 100; and a tooth 108 that is formed at the juncture between the slot 107 and the ramp surface 106. In this embodiment, the slot 107 is configured to receive the axially projecting projection provided by the end stop 52 such that when received therein, relative rotation between the primary air filter 12 and the air cleaner housing 14 is prevented unless sufficient manual force is provided to resiliently move and override the biasing force of the support arm 100 in the axial direction sufficiently to dislodge the axially projecting tab of the end stop 52 from the slot 107 and over the tooth 108.

With this arrangement, the lock tab 60 is configured to install in a predetermined rotational install direction, which in this case is clockwise with the lock member 105 at the forward leading end and the anchor base 102 at the trailing end. However, the reverse arrangement may also be provided in a different embodiment of an air cleaner housing with a counter clockwise arrangement being done according to a different mirrored arrangement.

A further advantage of this configuration is that a rotational interlock and tolerancing between top and bottom ends of the primary air filter does not necessarily need to be provided. Recalling that the mating projection 38 of the air cleaner housing cover is provided, it is noted that mating projection 38 does not need to be used. Instead, the primary air filter 12 can be simply rotated in the clockwise direction which in this instance is the predetermined rotational install direction with the ramp surface located at a front location for first engagement with the corresponding end stop 52.

Accordingly a new method of installing an air filter through an open end of the air cleaner housing is also provided. According to the new methodology, the primary air filter 12 is installed through the open end 16 of the air cleaner housing 14 along the central filter axis 46 into the overall housing assembly with the air filter media arranged to filter air flow flowing between the airflow inlet and the airflow outlet. The air filter 12 is rotated such that the ramp surface 106 engages the end stop 52 and the rotation is continued until the end stop projects into the slot 107 to rotationally and axially lock the air filter 12 with the housing 14. It is noted during this rotation, the cantilever supported support arm 100 is resiliently flexible and can travel axially relative to a remainder of the air filter 12 to allow flexing and snap action relative to end stop 52. During this movement, it is noted that the axial gasket ring 68 is moved into sealing relation between the air filter 12 and the housing 14 along the base end 40 to prevent unfiltered air flow between the airflow inlet 32 and the airflow outlet 30 from occurring without first passing through the air filter media 54. The open end 16 of the housing 14 can be closed by the housing cover 18, which may provide additional axial force and pressure upon the filter element to maintain the sealing relation and prevent the dislodgement of the air filter element. However, it is noted that regardless of the tightness of the cover or whether the cover is provided, the lock tab members 62 are positioned to keep the axial gasket ring 68 in proper location and in axial sealing relationship with the base end 40 of the housing 14 providing additional assurances of proper sealing relationship (such assurance may also be beneficial in embodiments that interact with mating projection 38). Specifically in this location, the end stop 52 can act upon the slot bottom at each individual location provided by the individual lock tab members preventing axial travel movement of the primary air filter 12 in a manner that would be desirable from a sealing standpoint.

Both during installation and removal, the support arm is resiliently flexed during engagement between the end stop and the ramp to bend the support arm axially until the end stop passes the tooth allowing the support arm to resiliently snap back with the end stop received within the slot (or vice versa during removal).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air filter, comprising:
a tubular ring of an air filter media extending about a central filter axis and having a first end and a second end, the tubular ring defining an internal volume;
a first end cap sealingly coupled to the first end;
a second end cap comprising:
(a) an attachment portion sealingly coupled to the second end,
(b) a lock tab being carried by and resiliently movable relative to the attachment portion radially outward therefrom and circumferentially about the central filter axis;
wherein the lock tab comprises:
a support arm integrally connected to the support ring at an anchor base and extending in a circular arc direction around the support ring in a cantilever manner with a circular arc gap extending radially between the support ring and the support arm to facilitate spring resiliency in the support arm, and a lock member at an end of the support arm opposite the anchor base; and further comprising:
a ramp surface facing axially toward the first end cap and extending at an incline of between 5 degrees and 45 degrees relative to a plane perpendicular to the central filter axis;
a slot facing axially toward the first end cap and positioned circumferentially between the ramp surface and the anchor base; and
a tooth being formed at a juncture between the slot and the ramp surface to provide the lock member.

2. The air filter of claim 1, wherein the attachment portion comprises an adhesive material and a support ring, the adhesive material forming a sealing attachment with the tubular ring, and the lock tab being integrally connected to the support ring.

3. The air filter of claim 1, wherein the support arm is formed from plastic material and the lock member is movable at least 0.5 millimeters relative to the support ring, and wherein the support arm comprises:
a minimum axial thickness of at least 1.5 millimeters;
a minimum radial thickness of between 1.5 millimeters and 25 millimeters; and
an angular span about the central filter axis of between 5 degrees and 45 degrees, at a radius relative to the central filter axis of between 5 centimeters and 30.5 centimeters.

4. The air filter of claim 2, wherein the support ring comprises an outer annular wall, an inner annular wall and an annular base wall interconnecting the inner annular wall and the outer annular wall to collectively define an annular potting well, with the adhesive material in the potting well.

5. The air filter of claim 4, wherein the annular base wall is perforated with apertures, the adhesive material extending through the apertures.

6. The air filter of claim 5, further comprising a preformed gasket ring supported on the support ring on an opposite side of the potting well, the gasket ring configured as an axial seal.

7. The air filter of claim 6, wherein the annular base wall defines a groove receiving the preformed gasket ring, the groove defined by a pair of annular side walls that encompass the apertures, wherein the gasket ring caps the apertures to prevent or limit the adhesive material from being exposed on the opposite side of the potting well, and wherein the adhesive material secures the gasket ring to the support ring.

8. The air filter of claim 1, wherein the lock tab comprises: a ramp surface, a slot, and a tooth being formed at a juncture between the slot and the ramp surface to provide a lock member, wherein the lock tab is configured to install in a predetermined rotational install direction with the ramp surface at a front location for first engagement relative predetermined rotational install direction with the tooth and slot located, in sequence.

9. The air filter of claim 1, wherein the lock tab comprises a plurality of individual lock tab members arranged in a spaced relation at regular angular intervals about the central filter axis.

10. The air filter of claim 1, wherein the first end cap is closed and the second end cap is open, and wherein the tubular ring is a frusto-conical pleated tubular ring.

11. The air filter of claim 1, wherein the tubular ring is a pleated tubular ring comprising a pleat depth of between 0.5 centimeter and 13.0 centimeters, a maximum outer diameter of between 7.5 and 64.0 centimeters.

12. The air filter of claim 1, wherein the air filter media comprises:
at least one of cellulose fibers or polymeric fibers; and
an initial filtration efficiency of at least 95% and a cumulative filtration efficiency of at least 99%, according to standard ISO5011-2014.

13. An air cleaner assembly comprising the air filter of claim 1, and further comprising:
a housing assembly comprising an air flow inlet and an air flow outlet, the housing assembly comprising a housing having an open end that is adapted to receive the air filter, and a cover closing the open end with the air filter housed in the housing assembly, the housing defining a base end and an annular sidewall projecting axially from the base end in surrounding relation of the central filter axis with the air filter housed therein, the base end defining one of the air flow inlet and the air flow outlet, the annular sidewall internally defining a plurality of catches at angular intervals about the central filter axis and proximate the base end, each catch defining a rib projecting in a circumferential arc segment about the central filter axis and an end stop projecting toward the base end at an end of the rib; and
wherein the lock tab comprises at least one individual lock tab member engaging with a corresponding at least one of the catches.

14. The air cleaner assembly of claim 13, wherein each individual lock tab member comprises a ramp surface, a slot, and a tooth being formed at a juncture between the slot and the ramp surface to provide a lock member, wherein an end stop projects into the slot in a rotationally installed position of the air filter in the housing assembly.

15. The air cleaner assembly of claim 14, wherein the air filter comprises a housing sealing gasket integrally connected to the second end cap, and wherein the housing sealing gasket is axially sealing against an internal sealing housing sealing surface defined by the base end.

16. A method of filter installation, comprising:
providing a housing assembly comprising an air flow inlet and an air flow outlet, the housing assembly comprising a housing having an open end, and a cover adapted to close the open end, the housing defining a base end and an annular sidewall projecting axially from the base end in surrounding relation of a central filter axis, the base end defining one of the air flow inlet or the air flow outlet, the annular sidewall internally defining a plurality of catches at angular intervals about the central filter axis and proximate the base end, each catch defining a rib projecting in a circumferential arc segment about the central filter axis and an end stop projecting toward the base at an end of the rib; and providing an air filter, the air filter comprising an assembly of component parts including an air filter media; a lock tab including a ramp surface, a slot, and a tooth being formed at a juncture between the slot and the ramp surface to provide a lock member; and a gasket member, and wherein the lock tab further comprises a support arm integrally connected to a support ring at an anchor base and extending in a circular arc direction around the support ring in a cantilever manner with a circular arc gap extending radially between the support ring and the support arm to facilitate spring resiliency in the support arm, and a lock member at an end of the support arm opposite the anchor base;

installing the air filter through the open end along the central filter axis into the housing assembly with the air filter media arranged to filter air flow between the air flow inlet and the air flow outlet;

rotating the air filter such that the ramp surface engages the end stop and continuing to rotate until the end stop projects past the tooth and into the slot to rotationally and axially lock the air filter and the housing;

resiliently flexing the support arm during engagement between the end stop and the ramp surface to bend the support arm axially until the end stop passes the tooth allowing the support arm to resiliently snap back with the end stop received in the slot;

sealing between the air filter and housing to prevent unfiltered air flow between the air flow inlet and the air flow outlet without passing through the air filter media; and closing the open end with the cover.

17. An air filter, comprising:

an air filter media extending along a central filter axis and having a first end and a second end;

a first end cap at the first end;

a second end cap at the second end, the second end cap comprising an adhesive material and a support member and a lock tab, the lock tab supported by the support member radially outward of the support member and circumferentially about the central filter axis, and wherein the lock tab comprises:

a ramp surface, a slot, and a tooth being formed at a juncture between the slot and the ramp surface to provide a lock member, wherein the lock tab is configured to install in a predetermined rotational install direction with the ramp surface at a front location for first engagement relative to the predetermined rotational install direction with the tooth and slot located, in sequence, and wherein the lock tab comprises: a support arm integrally connected to the support ring at an anchor base and extending in a circular arc direction around the support ring in a cantilever manner with a circular arc gap extending radially between the support ring and the support arm to facilitate spring resiliency in the support arm, and a lock member at an end of the support arm opposite the anchor base.

18. The air filter of claim 17, wherein the lock member is resiliently moveable relative to the support member.

19. The air filter of claim 17, wherein the support arm is formed from plastic material and the lock member is movable at least 0.5 millimeters relative to the support ring, and wherein the support arm comprises:

a minimum axial thickness of at least 1.5 millimeters;

a minimum radial thickness of between 1.5 millimeters and 25 millimeters; and an angular span about the central filter axis of between 5 degrees and 45 degrees.

\* \* \* \* \*